United States Patent
Stroila et al.

(10) Patent No.: US 11,170,138 B2
(45) Date of Patent: Nov. 9, 2021

(54) GEOGRAPHIC POSITION CALCULATION FOR SIGN PLACEMENT BASED ON DESTINATION PROFILING OF PROBE DATA

(71) Applicant: HERE Global B.V., Eindhoven (NL)

(72) Inventors: Matei Stroila, Chicago, IL (US); Bo Xu, Lisle, IL (US); Xidong Pi, Pittsburgh, PA (US)

(73) Assignee: HERE Global B.V., Eindhoven (NL)

( * ) Notice: Subject to any disclaimer, the term of this patent is extended or adjusted under 35 U.S.C. 154(b) by 585 days.

(21) Appl. No.: 15/840,248

(22) Filed: Dec. 13, 2017

(65) Prior Publication Data

US 2019/0179976 A1  Jun. 13, 2019

(51) Int. Cl.
| | | |
|---|---|---|
| *G06F 30/20* | (2020.01) | |
| *G01C 21/36* | (2006.01) | |
| *G01C 21/30* | (2006.01) | |
| *G06F 16/29* | (2019.01) | |
| *G06F 16/909* | (2019.01) | |
| *G06F 111/10* | (2020.01) | |

(52) U.S. Cl.
CPC .............. *G06F 30/20* (2020.01); *G01C 21/30* (2013.01); *G01C 21/3626* (2013.01); *G06F 16/29* (2019.01); *G06F 16/909* (2019.01); *G06F 2111/10* (2020.01)

(58) Field of Classification Search
CPC ........ G06F 30/20; G06F 16/909; G06F 16/29; G06F 2111/10; G01C 21/30; G01C 21/3626
USPC .......................................................... 703/2
See application file for complete search history.

(56) References Cited

U.S. PATENT DOCUMENTS

| | | | | |
|---|---|---|---|---|
| 8,073,460 | B1* | 12/2011 | Scofield | H04M 3/4878 |
| | | | | 455/456.1 |
| 8,509,820 | B2* | 8/2013 | Aoyagi | G06Q 30/02 |
| | | | | 455/457 |
| 8,666,989 | B1* | 3/2014 | Gilliam | G06Q 30/0251 |
| | | | | 707/741 |
| 2006/0053110 | A1* | 3/2006 | McDonald | G06Q 30/02 |

(Continued)

FOREIGN PATENT DOCUMENTS

EP      2386995 A1    11/2011

OTHER PUBLICATIONS

Dongyu Liu et al, "SmartAdP: Visual Analytics of Large-scale Taxi Trajectories for Selecting Billboard Locations" Hong Kong University of Science and Technology, Zhejiang University, University of Macau, pp. 1-6, Aug. 5, 2016.

(Continued)

*Primary Examiner* — Brian S Cook
(74) *Attorney, Agent, or Firm* — Lempia Summerfield Katz LLC

(57) ABSTRACT

Apparatus and methods are described for identification of a geographic location for sign placement. Probe data is received for a geographic area, and the probe data is collected by one or more sensors. Trips including destinations within the geographic area are matched with road segments from a geographic database. At least one potential sign placement road segment is compared to road segments of the trip. One or more destinations are selected from the trips based on the comparison of the at least one sign placement road segment to the trip road segments.

13 Claims, 14 Drawing Sheets

(56) References Cited

U.S. PATENT DOCUMENTS

| | | | |
|---|---|---|---|
| 2006/0099959 A1* | 5/2006 | Staton | B60R 25/33 |
| | | | 455/456.1 |
| 2009/0138336 A1* | 5/2009 | Ashley, Jr. | G06Q 30/0207 |
| | | | 455/456.1 |
| 2011/0055224 A1* | 3/2011 | Rossio | G01C 21/3644 |
| | | | 707/749 |
| 2014/0195470 A1 | 7/2014 | Xing et al. | |
| 2015/0323337 A1* | 11/2015 | Aiello | G01C 21/3682 |
| | | | 701/533 |
| 2017/0188199 A1* | 6/2017 | Ashley, Jr. | H04W 4/80 |

OTHER PUBLICATIONS

Hamid Reza Lashgarian Azad et al. "Billboard Advertising Modeling by Using Network Count Location Problem" Isfahan University of Technology, Iran, International Journal for Traffic and Transport Engineering, 2014, pp. 146-160, Dec. 14, 2013.

* cited by examiner

139

| $X_{A1}$ | $X_{A2}$ | $X_{A3}$ | $X_{A4}$ | $X_{A5}$ | $X_{A6}$ |
|---|---|---|---|---|---|
| $X_{B1}$ | $X_{B2}$ | $X_{B3}$ | $X_{B4}$ | $X_{B5}$ | $X_{B6}$ |
| $X_{C1}$ | $X_{C2}$ | $X_{C3}$ | $X_{C4}$ | $X_{C5}$ | $X_{C6}$ |
| $X_{D1}$ | $X_{D2}$ | $X_{D3}$ | $X_{D4}$ | $X_{D5}$ | $X_{D6}$ |
| $X_{E1}$ | $X_{E2}$ | $X_{E3}$ | $X_{E4}$ | $X_{E5}$ | $X_{E6}$ |
| $X_{F1}$ | $X_{F2}$ | $X_{F3}$ | $X_{F4}$ | $X_{F5}$ | $X_{F6}$ |

FIG. 4

| 139 | | | | | |
|---|---|---|---|---|---|
| 17 | 11 | 208 | 37 | 17 | 49 |
| 29 | 3 | 74 | 125 | 20 | 29 |
| 15 | 8 | 90 | 53 | 19 | 16 |
| 6 | 2 | 183 | 11 | 87 | 101 |
| 2 | 1 | 47 | 9 | 100 | 34 |
| 11 | 2 | 171 | 27 | 200 | 225 |

FIG. 5

GEOGRAPHIC POSITION CALCULATION FOR SIGN PLACEMENT BASED ON DESTINATION PROFILING OF PROBE DATA

FIELD

The following disclosure relates to calculation of a geographic position for sign placement, or more particularly, sign placement based on destination profiling of probe data from multiple trips traveled by probes, which may include vehicles or mobile devices.

BACKGROUND

A roadway may include roadside signs that include guidance information to aid a driver to a destination. A sign for a destination may list an upcoming turn (e.g., turn left in ¼ mile), an exit (e.g., take exit 10), or list a road to the destination (e.g., follow highway 10). In addition, signs may be displayed by a navigation system in a vehicle. The navigation system may illustrate turn-by-turn directions in relation to a graphical display of the roadway and an associated sign. In either scenario, challenges remain in the selection of the placement of the signs.

SUMMARY

In an embodiment, a method for calculating a geographic location for sign placement includes receiving probe data for a geographic area, the probe data collected by one or more sensors, identifying, based on the received probe data, a plurality of trips within the geographic area, wherein the plurality of trips include destinations, map matching the plurality of trips to a plurality of trip road segments from a geographic database, identifying at least one sign placement road segment from the geographic database, performing, using a processor, a comparison of the at least one sign placement road segment to the plurality of trip road segments, and outputting one or more destinations from the plurality of trips based on the comparison of the at least one sign placement road segment to the plurality of trip road segments.

In another embodiment, an apparatus for calculating a geographic location for sign placement includes at least a communication interface, a geographic database, and a controller. The communication interface is configured to receive probe data for a geographic area, the probe data collected by one or more sensors. The geographic database includes road segments for the geographic area. The controller is configured to match at least one trip from a plurality of trips for destinations within the geographic area with at least one sign placement road segment from the geographic database and perform a comparison of the at least one sign placement road segment to the plurality of trips to generate a message including one or more destinations from the plurality of trips based on the comparison.

In another embodiment, an apparatus includes at least position circuitry and a geographic database. The position circuitry is configured to determine a trip including a plurality of geographic positions of a mobile device. The geographic database is configured to store at least one sign placement location, wherein the at least one sign placement location calculated from a comparison of at least one sign placement road segment to a plurality of trip road segments from a plurality of trips including the trip of the mobile device.

BRIEF DESCRIPTION OF THE DRAWINGS

Exemplary embodiments of the present invention are described herein with reference to the following drawings.

FIG. 4 illustrates an example origin-destination matrix for sign placement calculation.

FIG. 5 illustrates the origin-destination matrix of FIG. 4 including example values and designations.

DETAILED DESCRIPTION

Figure 1:
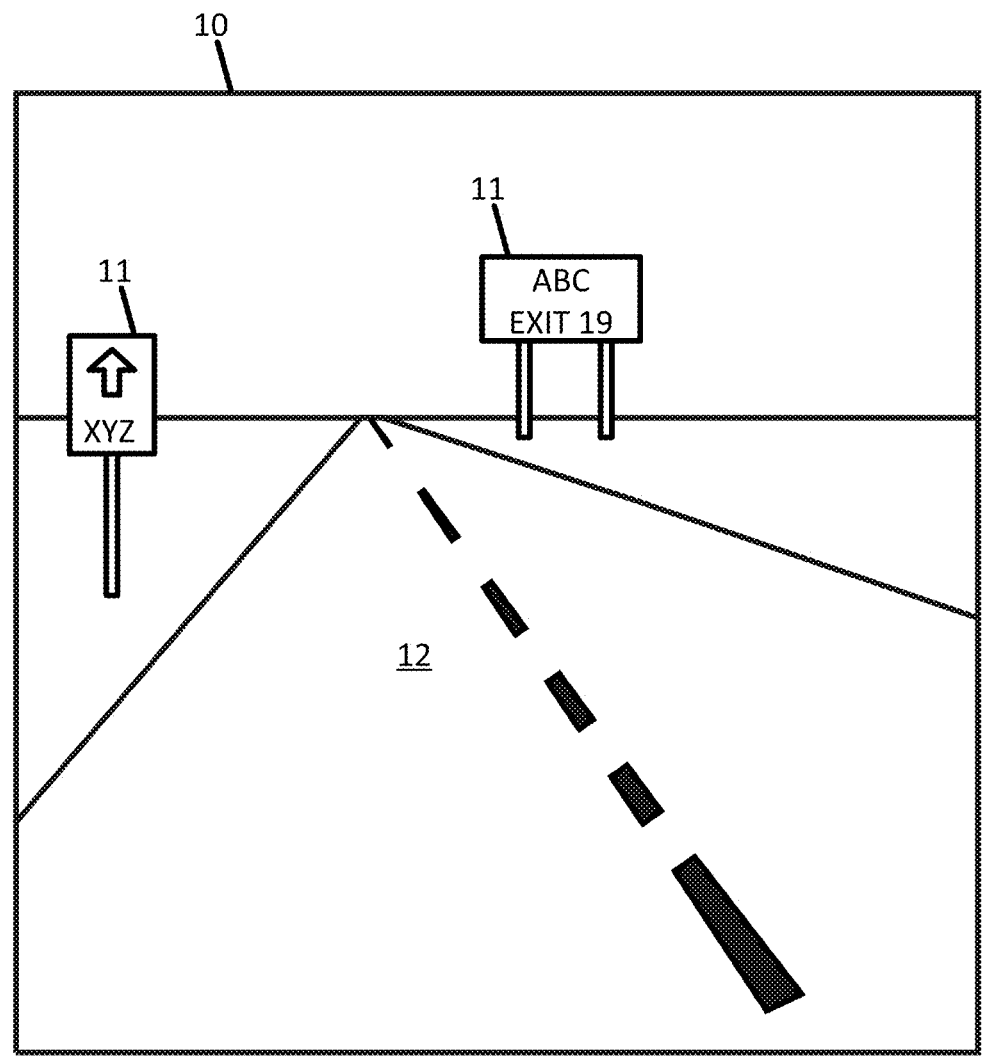
FIG. 1 illustrates an example roadway and sign placement.

FIG. 1 illustrates an example view 10 of a roadway 12 and the placement of example signs 11. The signs 11 may include a destination name and a directional element (e.g., arrow) or a destination name and an exit or intersection indicator (e.g., exit 19). The view 10 may describe a scene as viewed from a traveling vehicle. For example, the view 10 may be visible from the interior of the vehicle through the window or windshield. Alternatively, the view 10 may be a virtual depiction of such a roadway. The virtual depiction may be displayed on a navigation device. The navigation device may be an in-vehicle navigation system that displays graphical representation of the geographic area of the vehicle and includes virtual sign graphics. The virtual sign graphics may resemble signs that are not physically present along the roadway. The virtual sign graphics may be information windows displayed on the navigation system. The information windows may not resemble road signs (i.e., the information windows may not include sign posts or supports). In another example, the virtual sign graphics or information windows may be displayed by a mobile device using a mapping application or navigation application.

The following embodiments provide specialized algorithms for calculation of the placement of signs. In some examples, the placement of signs are geographic locations where posts are driven into the ground or signage is attached to other structures such as buildings, utility poles, or trees. In other examples, the sign placement relates to locations of a mobile device that trigger the display of such signs. The locations that trigger the mobile device to trigger sign display may also be geographic locations and may be the same geographic locations for the physical signs.

The calculation for the placement of signs is based on a destination profiling analysis using probe vehicle data. The analysis may include determination of trips that included particular points of interest (POIs) and the routes taken to the POIs. The routes may be organized by intersection or exits from a roadway. From this information, the following embodiments calculate a geographic location for sign placement.

Figure 2A:
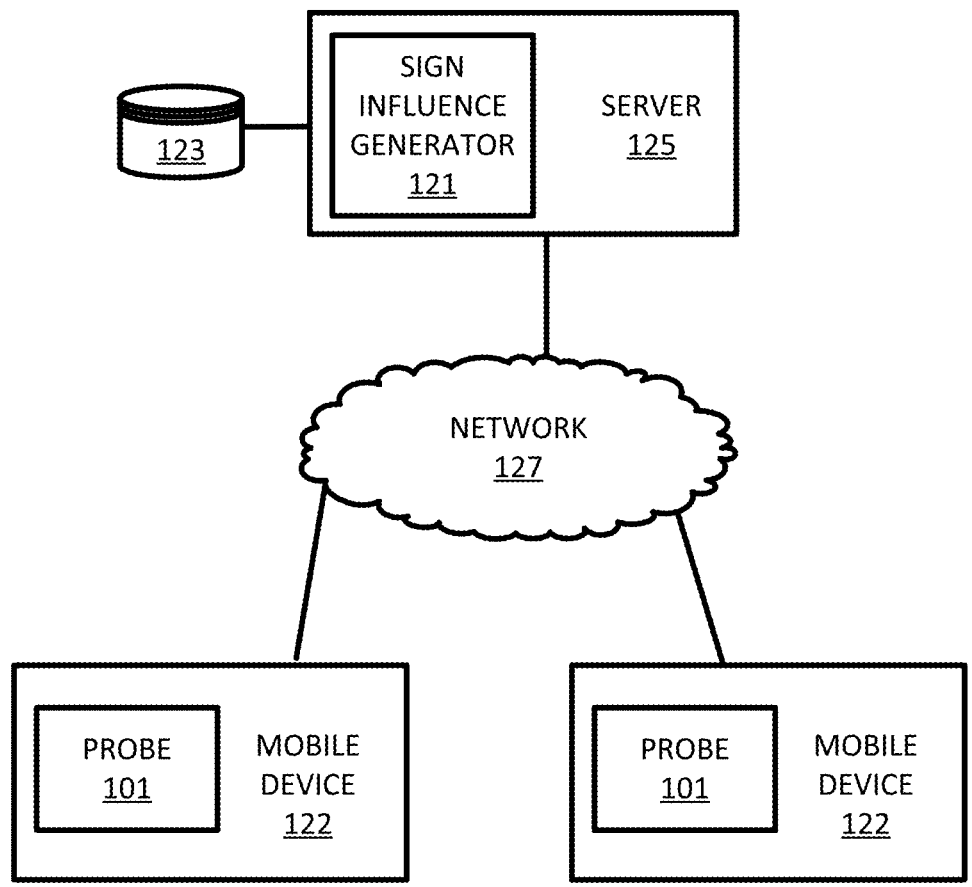
FIG. 2A illustrates an example system for sign placement calculation.

FIG. 2A illustrates an example system for sign placement calculations. In FIG. 2A one or more mobile devices 122 including a probe 101 may communicate through the network 127, or a different network, to a server 125 including a sign influence generator 121. Optionally, the one or more mobile devices 122 may include a driving assistance device. The driving assistance device and the mobile device 122 may be embodied by a single device (e.g., a vehicle navigation system) or the driving assistance device may be separate from the mobile device 122. A database 123, including a map database, is also connected to the server 125. Other map databases may be included at the mobile devices 122. The database 123 and the server 125 make up a developer system. Multiple mobile devices 122 may be connected to the server 125 through the network 127. Additional, different, or fewer components may be included.

The probe 101 collects sensor data for the location of the mobile device 122. The location of the mobile device 122 over time represents a trip traveled by a vehicle, or otherwise traveled by a user via pedestrian travel, bike travel, boat travel, or another mode of transportation.

The probe 101 may include a sensor for a Global Positioning System (GPS), Global Navigation Satellite System (GNSS), or a cellular or similar position sensor for providing location data. The positioning system may utilize GPS-type technology, a dead reckoning-type system, cellular location, or combinations of these or other systems.

The probe 101 may include any combination of an optical distance system such LiDAR, an image capture system such as a camera, a sound distance device such as sound navigation and ranging (SONAR), a radio distancing device such as radio detection and ranging (RADAR) or another sensor. The camera may be a visible spectrum camera, an infrared camera, an ultraviolet camera or another camera.

The probe 101 may generate a point cloud that includes data points that derived from distancing devices such as the LiDAR, SONAR, or RADAR devices. The point cloud may comprise three-dimensional data points including in a coordinate system such as (x, y, z) or (latitude, longitude, altitude). The point cloud may be measured in distances and angles between the object described by the points in the point cloud to the collection device. In this example, the data points may be described as (distance, angle1, angle2). The angles may be measured from a set of axes. For example, angle1 may be measured from a horizontal axis intersecting with the position of the collection device and angle2 may be measured from a vertical axis intersecting the position of the collection device.

The images or distance data describes roadway features such as lane markings and road furniture, geographic features, or other objects. Using the images, distance data, or a combination thereof, the position of the probe 101 may be compared to a stored reference template for localization. The reference template describes the expected roadway features, geographic features, or other objects that should be detected by the camera or distancing devices at various locations. For localization, the mobile device 122 may access a local database, or database 123, in order to compare the detect environment of the mobile device 122 to stored reference templates.

The mobile device 122 may modify the sensor data collected by probes 101 before relaying the sensor data to the server 125 by way of the network 127. The mobile device 122 may filter the sensor data according to a filter value describing the applicability to tracking trips of the probes 101. The filter value may filter the sensor data to forward only data describing mobile devices 122 traveling at least a threshold speed. The filter value may filter the sensor data to forward only data describing mobile devices 122 traveling at least a threshold distance from a road segment, or specific type of road segment such as one or more particular functional classifications of road, as described further below.

The mobile device 122 may sort the sensor data according to a sort value describing the applicability to tracking trips of the probes 101. The sort value may sort the data over time. That is the mobile device 122 may collect a complete trip, or substantially a complete trip, before forwarding the data to the server 125. The mobile device 122 may determine that a trip is complete when the location of the mobile device 122 returns to an origin, or previous point. The mobile device 122 may determine that a trip is complete when the location of the mobile device 122 leaves the geographic area.

The mobile device 122 may filter the sample data according to a sample value describing the applicability to tracking trips of the probes 101. The sample value may be an interval of time. By sampling the data to include only one data point every time interval, the amount of data forwarded to the server 125 to the mobile device 122 is reduced. The sample value may be a geographic distance interval. By sampling the data to include only one data point every distance interval, the amount of data forwarded to the server 125 to the mobile device 122 is reduced.

The mobile device 122 collects probe data for a geographic area. The geographic region may be defined as a city or a portion of a city. The geographic region may be an area measured as a radius from a point or as a radius from a roadway. The area measured as a radius from a roadway may have a length in the shape of the roadway and a width according to the radius, or twice the radius.

The mobile device 122 may identify one or more routes or trips from the sensor data based on filtering the sensor data according to the filter value, sorting the sensor data according to the sort value, and/or sampling the sensor data according to the sample value. The routes or trips may be defined in a variety of techniques. A trip may include the path followed from any origin to a destination. A trip may include the path followed from the edge of the predetermined geographic region to a destination. The trip may include any path that intersects a particular roadway. The trip may include all the position data collected by an individual mobile device 122 in a predetermined range of time (e.g., in one day or in one hour).

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

Communication between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

The server 125 receives probe data for the geographic area, which includes sensor data collected by one or more sensors associated with one or more mobile devices 122. The server 125 may be connected to the mobile devices 122 through a particular type (e.g., manufacturer) of vehicle or mobile device 122 or a particular provider for network 127. The server 125 may be connected to the mobile device 122 through a mobile application optionally installed and activated by the user.

The server 125 may also identify routes or trips traveled by the one or more mobile devices 122. As described above, the trips may be defined according to the geographic area. That is, the trips are designated as beginning or ending when the geographic area is crossed by the mobile device. Alternatively, the trips may be defined according to a time cycle (i.e., a trip is defined as the path followed every time interval). The trips may also be defined as any path that intersects a particular road segment.

The server 125 is further configured to identify trips within the geographic area. The identified trips may span multiple mobile devices and/or span multiple days or other time intervals. In some examples, the identified trips may span many devices (e.g., over one hundred) and span many time intervals (e.g., over a month or a year of hourly time intervals). The identified trips may be organized, filtered, or sorted according to destination, origin, road segments, or frequency thereof.

The server 125 is further configured to map match the trips to trip road segments from the geographic database 123. The sensor data for the trips includes geographic coordinates for the locations from which the sensor data was collected. The server 125 is further configured to compare the geographic coordinates for the trips to geographic coordinates of road segments stored in the geographic database 123. The road segments that overlap the trips are identified and stored in a list or table by the server 125.

The server 125 is further configured to compare the stored list or table to one or more sign placement road segments or specific sign placement geographic location. The sign placement road segments or specific sign placement geographic locations are locations where signs have been placed. An example sign may list any one or a combination of a destination name, a point of interest name, a distance, a direction, an advertisement, an image or other characteristics of the route and/or destination. The sign locations may be stored as the signs were installed. The sign locations may be detected according to the camera or distance devices described herein. The server 125 determines that a trip has passed by a sign placement location through the compares of the stored list or table of road segments for the trips to the sign placement road segments or locations. When there is a match, the server 125 identifies the at least one matching sign placement road segment.

For the comparison, the server 125 may be configured to compare a road segment identifier from the stored list or table to one or more road segment identifiers for the sign placement road segments. For the comparison, the server 125 may be configured to compare endpoints or nodes from the stored list or table to one or more endpoints or nodes for the sign placement road segments.

In alternative examples, the trips from the probe data are compared to one or more sign placement road segments or specific sign placement geographic location without using full road segments. The trips may be matched to portions of road segments or to individual lanes of road segments. The road segment dichotomy for the trips may not be used. Instead, the trips may be described or organized as geographic tiles, a predetermined geographic area indexed in two dimensions, or using absolute or relative geographic coordinates such as latitude, longitude, and optionally altitude.

The server 125 is further configured to output destinations from the trips based on the comparison of the at least one sign placement road segment to the trip road segments when there is a match. In other words, when there is match between the sign placement road segment and one or more trip road segments, the server 125 determines the destination associated with the trip. The destination may be the last geographic point on the trip. Alternatively, the destination may be any point of interest along the trip. More specifically, the destination may be any downstream point of interest after the sign placement road segment along the trip. That is the downstream point of interest is a point of interest that the mobile device 122 visited or passed by after traveling the sign placement road segment.

In one example a vehicle including mobile device 122 travels along a first roadway where a sign has been placed adjacent to the roadway. The vehicle and mobile device 122 turns to a second roadway and stops at a point of interest. Through the comparison described above, the server 125, by way of sign influence generator 121, associates the point of interest with the first roadway. The association between the point of interest and the first roadway, or the sign adjacent to the first roadway, may be an influence value. The influence value indicates how likely travel along the first roadway will result in visiting the point of interest.

The influence value, or a comparison of different influence levels, may aid in determining the best location and content for signs along roadways. The model incorporates various factors that may affect the influence or utility of the sign, such as the relative locations of other points of interest, the travel cost variation to different locations, and the decay of user memory due to travel distance or time. For example, in order to maximize the influence of a sign, the model gives high priority to an upstream highway exit that is close to points of interest as the sign placement location. For the content of the sign, the model favors a point of interest that is currently attracting minor traffic.

Figure 2B:
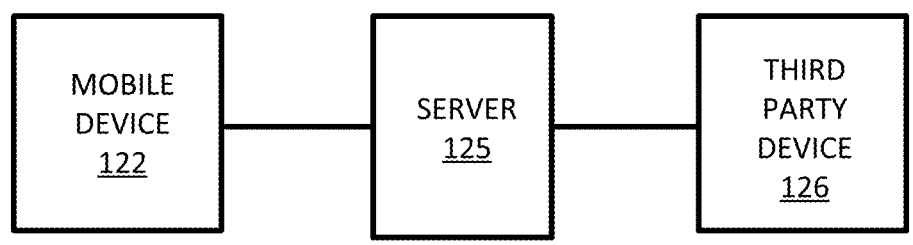
FIG. 2B illustrates another example system for sign placement calculation and dispatch.

FIG. 2B illustrates another example system for sign placement calculation and dispatch including the mobile device 122, the server 125, and a third party device 126. Additional, different, or fewer components may be included.

As described above, the server 125 includes a controller configured to match at one or more trips for destinations within the geographic area with at least one sign placement road segment and perform a comparison of the at least one sign placement road segment to the trip road segments to generate a message including one or more destinations from the of trips based on the comparison of the at least one sign placement road segment to the trip road segments.

The third party device 126 may be operated by a government agency for placing signs along roadways. The third party device 126 may be employed by a business or point of interest for selecting the location of signs describing the point of interest. The third party device 126 may be employed by a map developer for defining sign placement locations. The third party device 126 may generate messages in response to the influence values. A sign placement message may include recommended sign placement locations by geographic coordinates or by road segment. A dispatch message may also include an instruction for a robotic device or personnel to visit the location for installation of the sign.

The third party device 126 may be another mobile device that displays the sign electronically. That is, the third party device 126 may receive the influence values and/or the outputted destinations for sign placement and electronically display the sign when the user approaches, arrives at, or passes one or more of the destinations. The content of the electronic sign may be received with the influence values and/or the outputted destinations or may be selected internally by the third party device 126.

Figure 3:
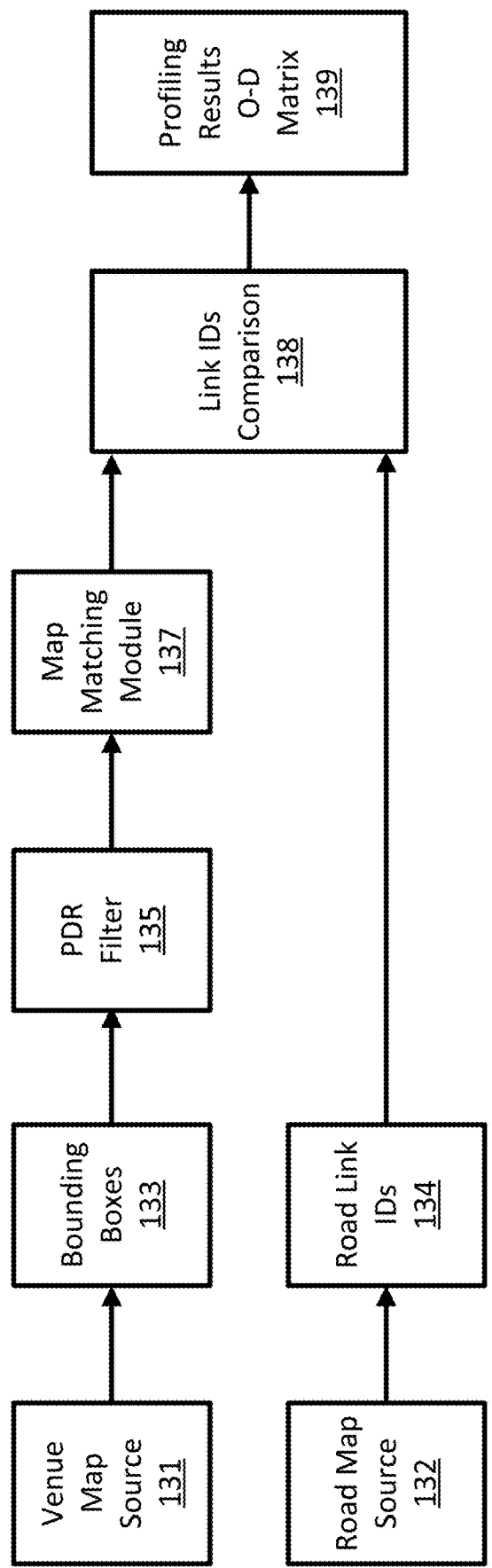
FIG. 3 illustrates a specialized algorithm for sign placement calculation.

FIG. 3 illustrates a specialized block diagram for sign placement calculation. The venue map source 131, a road map database 132, a bounding box 133, road link IDs 134, a filter probe data repository (PDR) 135, map matching module 137, a link IDs comparison 138, and a profiling results origination-destination (O-D) matrix 139. Additional, different, or fewer components may be included.

The venue map source 131 is a memory or database that stores the locations of points of interest or other destinations. Example points of interest include buildings, museums, restaurants, stores, parks, municipal facilities, other businesses. The road map source 132 is a memory or database that stores the locations of road segments. The road map source 132 may designate a type of road for the road segment. Road types may include local roads and highways. The highways may include exit ramps that connect the highways to local roads. The road map source 132 provides the road link IDs 134, which may be road segment identifiers for road segments that are suitable for sign placement. The road segment identifiers may be numeric codes. In one example, the road link IDs 134 describe all highway off ramps or exits. In another example, the road link IDs 134 describe intersection of major roads.

The bounding box 133 may define a predetermined geographic area. The bounding box 133 is applied to the data from the venue map source 131 to define a set of destination within the bounding box 133. The bounding box 133 may be defined by a user input. The bounding box 133 may be defined by a geographic distance radius. The bounding box 133 may be defined by a footprint that is defined according to travel time. That is, the geographic extent of the bounding box 133 in each direction may be a function of the speed of traffic in that direction.

The PDR filter 135 includes all trips for all monitored geographic areas. As described above, a trip may be defined using various techniques. The trips may be sets of location data for probes over time. A trip may be defined temporally (e.g., the trip may extend in time as long as probe data is returned) or geographically (e.g., the trip may extend until a geographic boundary is crossed). The PDR is filtered according to the bounding boxes 133 in order to generate a set of trips that occur within the bounding boxes 133 or intersect with the bounding boxes 133.

The map matching module 137 map matches the filtered trips from the PDR to geographic locations and/or road links associated with the geographic location. The map matching module 137 may output a set of link IDs for each of the trips from the PDR that is associated with the bounding boxes 133.

The link IDs comparison 138 compares two set of link IDs. The first set, from the road link IDs 134, describes road segments that are suitable for sign placement. The second set, from the map matching module, are the road segments for the trips in the bounding boxes 133. The link IDs comparison 138 may identify matches between the two sets of link IDs. A match may be an exact match. That is, the match may mean that a road segment identifier output from the map matching module 137 is the same as a road segment identifier in the road link IDs 134. The match may be a partial match. The link IDs comparison 138 may compare many IDs from each set and output multiple matched link IDs.

The results of the link IDs comparison 138 may be stored or presented as a profiling results origination-destination (O-D) matrix 139. The O-D matrix 139 includes the matches from the link IDs comparison 138. The O-D matrix 139 associates points of interest (e.g., the road segment including the point of interest) from the output of the map matching module 137 with the location of the sign (e.g., the road segment including the sign placement location) from the road link IDs. Each value in the O-D matrix 139 represents a match, which is a trip that included both the sign placement location and the point of interest location.

FIGS. 4 and 5 illustrate example O-D matrices 139 that match the at least one sign placement road segment to the destinations. The example O-D matrix 139 is for six possible sign placement locations (e.g., locations near off ramps) and six possible destinations (e.g., POIs associated with signs at the sign placement location). For this example, consider that direction signs for each of the destinations are located at each of the sign placement locations. In this simple and comprehensive example, the response to all signs at all location are easily compared by the O-D matrix 139. The value of X is a numerical value for the number of matching trips. The six possible sign placement locations are A, B, C, D, E, F, and the six possible destinations are 1, 2, 3, 4, 5, 6. Thus, $X_{c2}$ is the number of trips from sign placement location C to destination 2, and $X_{F5}$ is the number of trips from sign placement location F to destination 5.

FIG. 5 illustrates a set of data for the O-D matrix 139. The value 17 indicates that 17 trips from the PDR in the bounding box traveled in a path passing sign placement location A and destination 1. The top four most associated sign placements and destinations are highlighted (e.g., there were 208 trips from sign placement location A to destination 3, 183 trips from sign placement location D to destination 3, 200 trips from sign placement location F to destination 5, and 225 trips from sign placement location F to destination 6). The highest occurrences (e.g., above a threshold quantity or in percentile such as top quartile) of matches in the O-D matrix 139 may be selected as recommend sign placement locations for particular destinations. In one example, the O-D matrix 139 is displayed to a user for selection of sign placement locations for particular destinations. In another example, the server 125 analyzes the O-D matrix 139 to identify the recommended sign placement locations based on the highest trip count. The server 125 may select the highest trip count among possible destinations to identify the preferred destination for a particular sign placement location and select a sign for the preferred destination. The server 125 may select the highest trip count among possible sign placement location to identify the preferred sign placement location for a particular destination.

Figure 6:
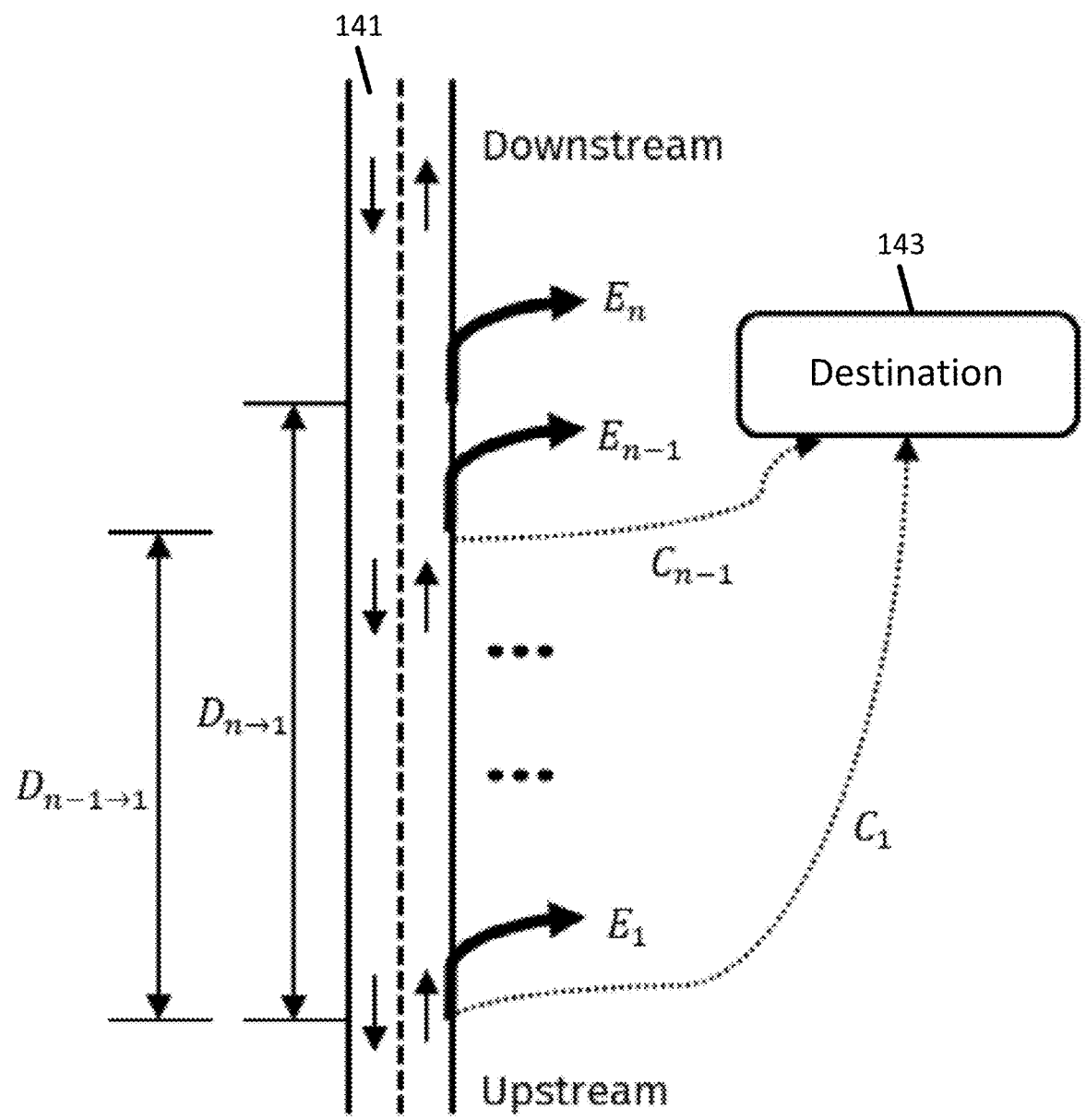
FIG. 6 illustrates a single destination geographic area for sign placement.

FIG. 6 illustrates a single destination geographic area for sign placement. A roadway 141 includes multiple exits (E), which are designated as $E_1$ in the most upstream in the travel direction of the geographic area to $E_n$ in the most downstream travel direction of the geographic area. One or more of the exits from roadway 141 leading to one or more other road segments providing a path to destination 143, which may be a business, park, residence, or any type of point of interest. The distance from the current position, assumed to be exit k, to any exit $E_n$ is $D_{k \to n}$ and the distance from the current position i to exit $E_{n-1}$ is $D_{k \to n-1}$.

The sign influence generator 121 may calculate influence values based on travel cost and respective distances between the at least one sign placement road segment and destinations. Equation 1 provides an example for calculating the influence $I_k$ for a sign placement at position k where position k includes an intersection or an exit from roadway 141. The model of Equation 1 may be limited by a maximum distance from the upstream portion of roadway 141 to the downstream portion of the roadway 141. The model of Equation 1 may be applicable for a single destination example (e.g., destination 143). The model of Equation 1 may be applicable when the traffic volume is constant or substantially constant along roadway 141. The term substantially constant may mean within a predetermined range such as within plus or minus 10%. Traffic volume may be measured in vehicles per unit time, vehicles per unit distance, or by speed.

$$I_k = \sum_{i=k}^{n} C_i^{-\alpha} \cdot (1 + D_{k \to i})^{-\beta} \quad \text{Eq. 1}$$

The summation from current position k to the extent of the downstream direction of the geographic area n, $\Sigma_{i=k}^{n}$, adds the influence value terms across multiple exits or intersections from the current position to the downstream extent of the geographic area. The model may be adjusted to account for a set number of routes or a set number of exits or intersection from the current point to the destination.

The travel cost term, $C_i^{-\alpha}$, or $C_i$ in some examples, represents a travel cost or a travel time or travel distance from the exit or intersection at i until the destination 143. The higher the travel cost, the lower the influence, i.e., $C_i \nearrow I_k \searrow$. The travel cost term may depend on the vehicle and/or the route the destination. The travel cost term may describe fuel consumption for a vehicle. The travel cost term may be a time-based function (e.g., vary according to time). The travel cost term may be based on real-time data received from an external source. The travel cost term may be based on traffic or weather at the current time. The travel cost may be based only on distance. As travel time or travel costs are smaller, the influence value is greater. The model parameter $\alpha$ limits the travel cost according to a logarithmic decal. The model parameter $\alpha$ may have a fractional or decimal value between 0 and 1. The model parameter $\alpha$ may be selected based on experimental results or trial and error. The model parameter $\alpha$ may be selected according to specific region. Different geographic errors may be assigned different values for the model parameter $\alpha$. Urban areas may have larger values than rural areas because there are fewer signs. The type of road adjacent to the sign placement may impact the model parameter $\alpha$. The model parameter $\alpha$ may be set according to the functional classification for the road segment associated with the sign placement. Other example factors for the model parameter of the travel cost term may include the time of day, the day of the week, the day of the year.

Various functional classification systems may be used. One example of a functional classification maintained by the United States Federal Highway administration. The simple system includes arterial roads, collector roads, and local roads. The model parameter $\alpha$ may be a first value for arterial roads, a second value for collector roads, and a third value for collection roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

The distance term, $(1+D_{k \to i})^{-\beta}$, describes a distance from the sign placement at the current position k to any downstream exit i. The higher the distance, the lower the influence, i.e., $D_{k \to i} \nearrow I_k \searrow$. The model parameter $\beta$ limits the distance term according to various factors. The model parameter $\beta$ may cause the distance term to decay according to the diminishing effect of the driver's attention and/or the decay of memory of the driver. Example factors for the model parameter of the distance term include human factors such as how tired the driver is, how hungry the driver is, the age of the driver, whether children are present in the car, memory of the driver, or other factors.

The sign influence generator 121 may determine a preferred location for sign placement by comparing multiple influence values for different possible sign placement locations. The sign influence generator 121 may identify the largest influence value and select the sign placement location corresponding to the largest influence value. Equation 2 provides an example of sign placement according to the largest influence value, found at position i*.

$$i^* = \arg\max_i I_i \quad \text{Eq. 2}$$

Figure 7:
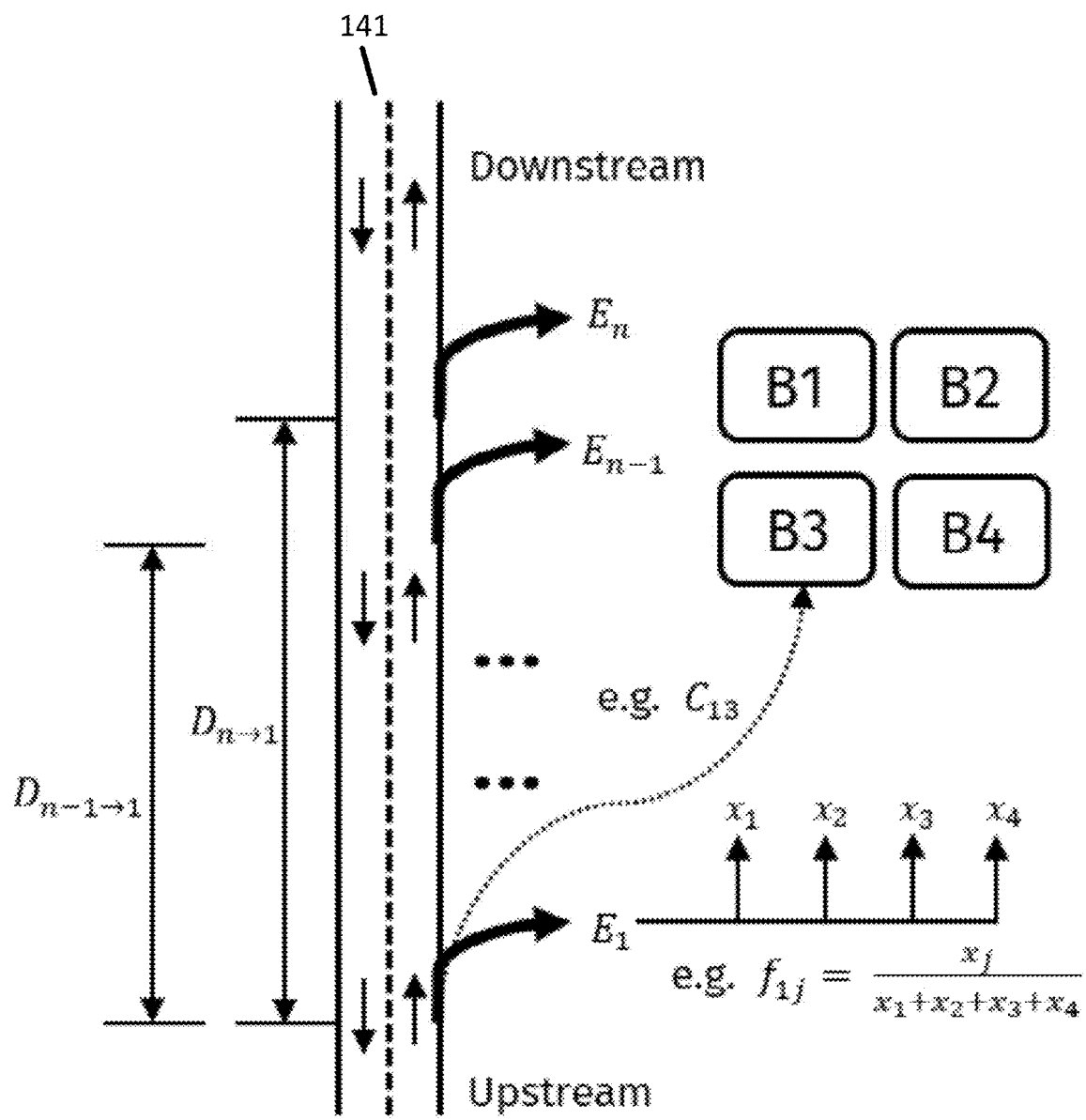
FIG. 7 illustrates a multiple destination geographic area for sign placement.

FIG. 7 illustrates a geographic area for sign placement in consideration of multiple destinations. A roadway 141 includes multiple exits (E), which are designated as $E_1$ in the most upstream in the travel direction of the geographic area to $E_n$ in the most downstream travel direction of the geographic area. One or more of the exits from roadway 141 leading to one or more other road segments providing a path to one or more of destinations B1, B2, B3, and B4, which may be any type of destination. Similarly, the distance from the current position, assumed to be the exit k, to any exit $E_n$ is $D_{k \to n}$ and the distance from the current position i to exit $E_{n-1}$ is $D_{k \to n-1}$. The sign influence generator 121 may calculate influence values for multiple destinations based on travel cost, respective distances between the at least one sign placement road segment and destinations, and relative frequency of historical trips to different destinations. Equation 3 provides an example for calculating the influence $I_k$ for a sign placement at reference position k where position k includes an intersection or an exit from roadway 141 with respect to a destination j. The model parameter γ represents a scaling factor for the fractional frequency, which is another model parameter.

$$I_{kj} = \sum_{i=k}^{n} C_{ij}^{-\alpha} \cdot (1 + D_{k \to i})^{-\beta} \cdot f_{ij}^{-\gamma} \qquad \text{Eq. 3}$$

The model of equation 3 includes a travel cost $C_{ij}^{-\alpha}$ from position i to the destination j and α represents a first model parameter. The distance term $(1+D_{k \to i})^{-\beta}$ is a distance from the reference position k to position i and β represents a distraction of attention due to decay of memory. The fractional frequency term $f_{ij}^{-\gamma}$ describes a portion of trips from position i that arrive at or pass destination j from the trip profiling.

As illustrated in FIG. 7, the fractional frequency may be calculated according to Equation 4. The fractional frequency for any destination j may be the quantity of trips traveling to or near the destination j divided by the total quantity of trips. The fractional frequency is the fraction of trips attributed to a particular destination.

$$f_{1,j} = \frac{x_j}{x_1 + x_2 + x_3 + x_4} \qquad \text{Eq. 4}$$

When a sign is more influential, the sign may have a greater impact on traffic. The lower the fractional frequency for a destination, the higher influence for a sign placement of the destination: $f_{ij} \searrow I_{kj} \nearrow$. In other words, the model of equation 3 favors a destination that is currently attracting minor traffic.

The sign influence generator 121 may calculate the fractional frequency for the trips based on the comparison of the number of trips for at least one sign placement road segment to the total number of trip road segments. The sign influence generator 121 may select a geographic location for sign placement based on the fractional frequency.

Table 1 illustrates results from the model of Equation 3 using muliple destinations, which may be referred to as an influence matrix.

|  | Exit | | | |
| --- | --- | --- | --- | --- |
| Destination | $E_1$ | ... | $E_{n-1}$ | $E_n$ |
| $B_1$ | $I_{1,1}$ | ... | $I_{n-1,1}$ | $I_{n1}$ |
| $B_2$ | $I_{1,2}$ | ... | $I_{n-1,2}$ | $I_{n2}$ |
| $B_3$ | $I_{1,3}$ | ... | $I_{n-1,3}$ | $I_{n3}$ |
| $B_4$ | $I_{1,4}$ | ... | $I_{n-1,4}$ | $I_{n4}$ |

Each column of the influence matrix may be used to compare the influence of a sign placement location E (e.g., near a particular exit of a highway) to various destinations B. For example, the influence of sign placement location $E_1$ for destination $B_1$ is $I_{1,1}$. A comparison (e.g., selecting the maximum) of influence values associated with $E_1$ indicates the destination that receives the most traffic in response to a sign placement at $E_1$. Similarly, a comparison of influence values associated with $E_n$ indicates the destination that receives the most traffic in response to a sign placement at $E_n$. Using this technique, the sign influence generator 121 may compare influence values for different destinations to identify a destination that maximizes benefit from a particular sign placement location. For example, Equation 5 selects the nest sign placement location (exit or position i*) with maximum influence value for destination $B_2$.

$$i^* = \text{argmax}_i I_{i,2} \qquad \text{Eq. 5}$$

Each row of the influence matrix may be used to compare the influence of different sign placement locations for the same destination. For example, the influence of the different sign placements for destination $B_1$ include $I_{1,1}$, $I_{n-1,1}$, and $I_{n1}$. The largest value among the different sign placements represents the most effective sign placement in influencing drivers to visit destination $B_1$. Using this technique, the sign influence generator 121 may compare influence values for different sign placement to identify a sign placement to assign to a particular destination. For example, Equation 6 selects destination j* as the most suitable content for a sign at location $E_1$.

$$j^* = \arg \max_j I_{1,j} \qquad \text{Eq. 6}$$

The sign influence generator 121 may dynamically update the influence matrix to reflect changes in traffic patterns, times of day, and/or driver patterns.

Figure 8:
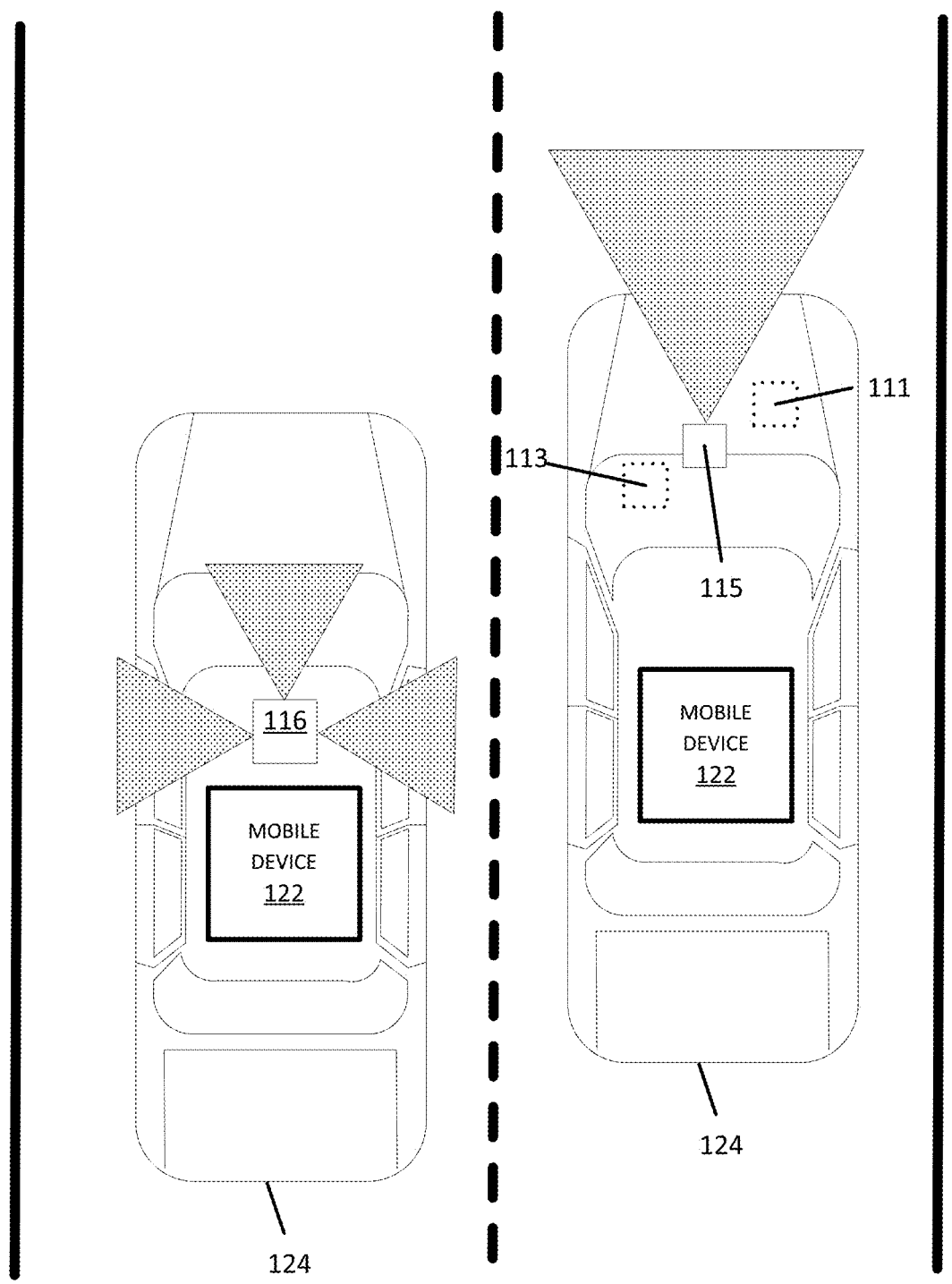
FIG. 8 illustrates example data collection vehicles and/or assisted driving vehicles.

FIG. 8 illustrates example vehicles for collection of data for generating geometries for lane line objects. A connected vehicle includes a communication device and an environment sensor array (e.g., corresponding to probe 101) for reporting the surroundings of the vehicle 124 to the server 125. The connected vehicle may include an integrated communication device coupled with an in-dash navigation system. The connected vehicle may include an ad-hoc communication device such as a mobile device or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle. The sensor array may include multiple sensors. Example sensors include an optical distance system such as a LiDAR system 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera. The LiDAR system 116, an image capture system 115 may collect sensor data that describes whether or not the vehicle 124 is traveling in a tunnel, whether or not the sun is shining, whether or not the current weather includes precipitation, or other factors external to the vehicle 124.

The vehicles 124 may include a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122.

In some alternatives, additional sensors may be included in the vehicle 124. An engine sensor 111 may include a throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. The vehicle sensor 113 may include a microphone, an internal camera, or another sensor to detect the internal environment of the vehicle 124. Any vehicle may include any combination of the sensors. The sensors are shown in association with different vehicles for the ease of illustration.

The mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122. The assisted driving vehicles may response to geographic data received from geographic database 123 and the server 125, which may have been updated. The mobile device 122 is configured to perform a driving assistance function in response a user input or selection of a destination associated with sign placements according to examples herein.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in response to detected objects or objects in the geographic database 123. The objects in the geographic database 123 may include one or more lane line objects or other road objects generated according to the techniques described herein. The autonomous vehicle is configured to generate a driving command in response a user input or selection of a destination associated with sign placements according to examples herein.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and/or objects in the geographic database 123. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and/or objects in the geographic database 123. The objects in the geographic database 123 may include sign placements according to examples herein.

Figure 9:
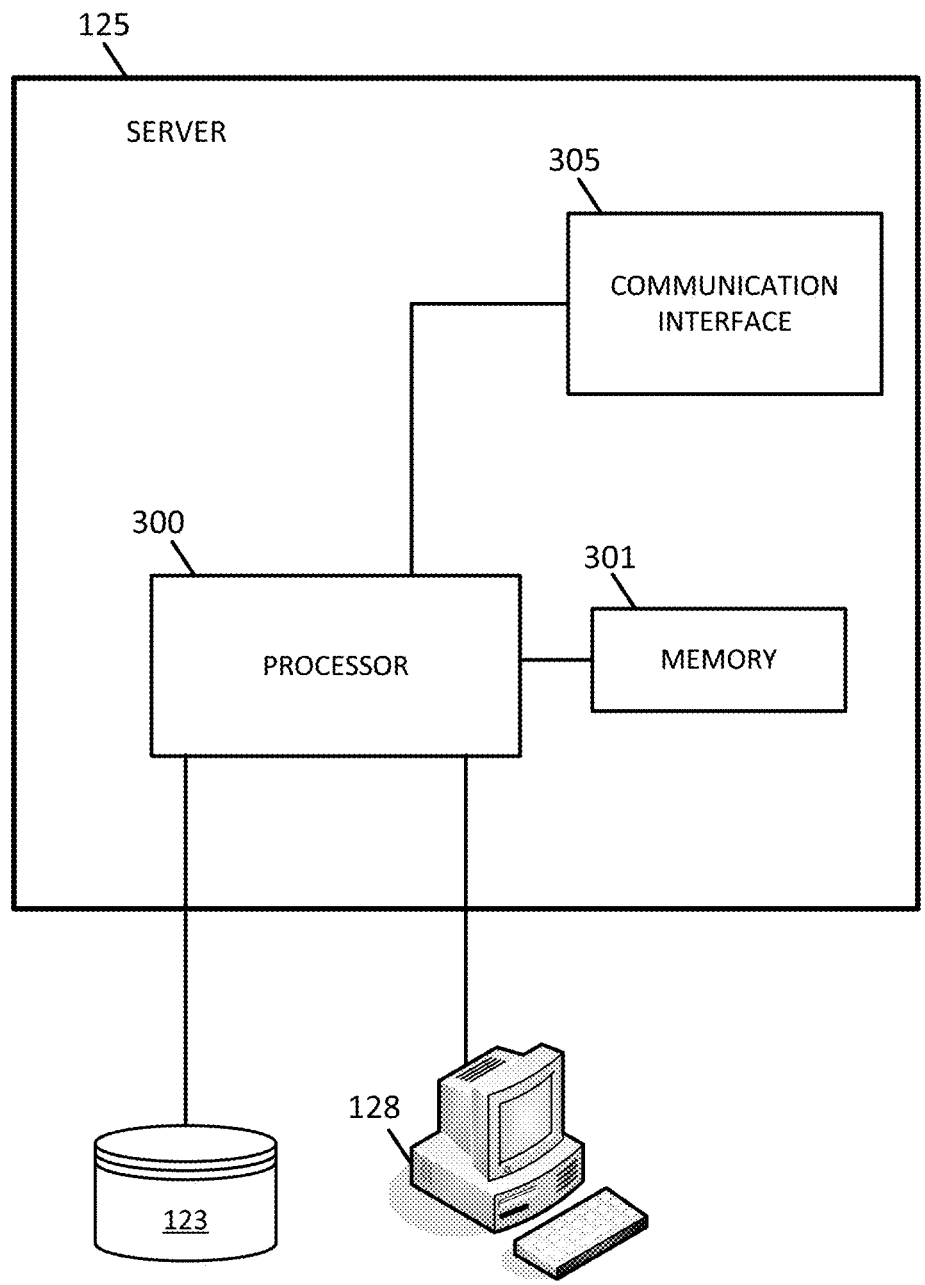
FIG. 9 illustrates an example server.
Figure 10:
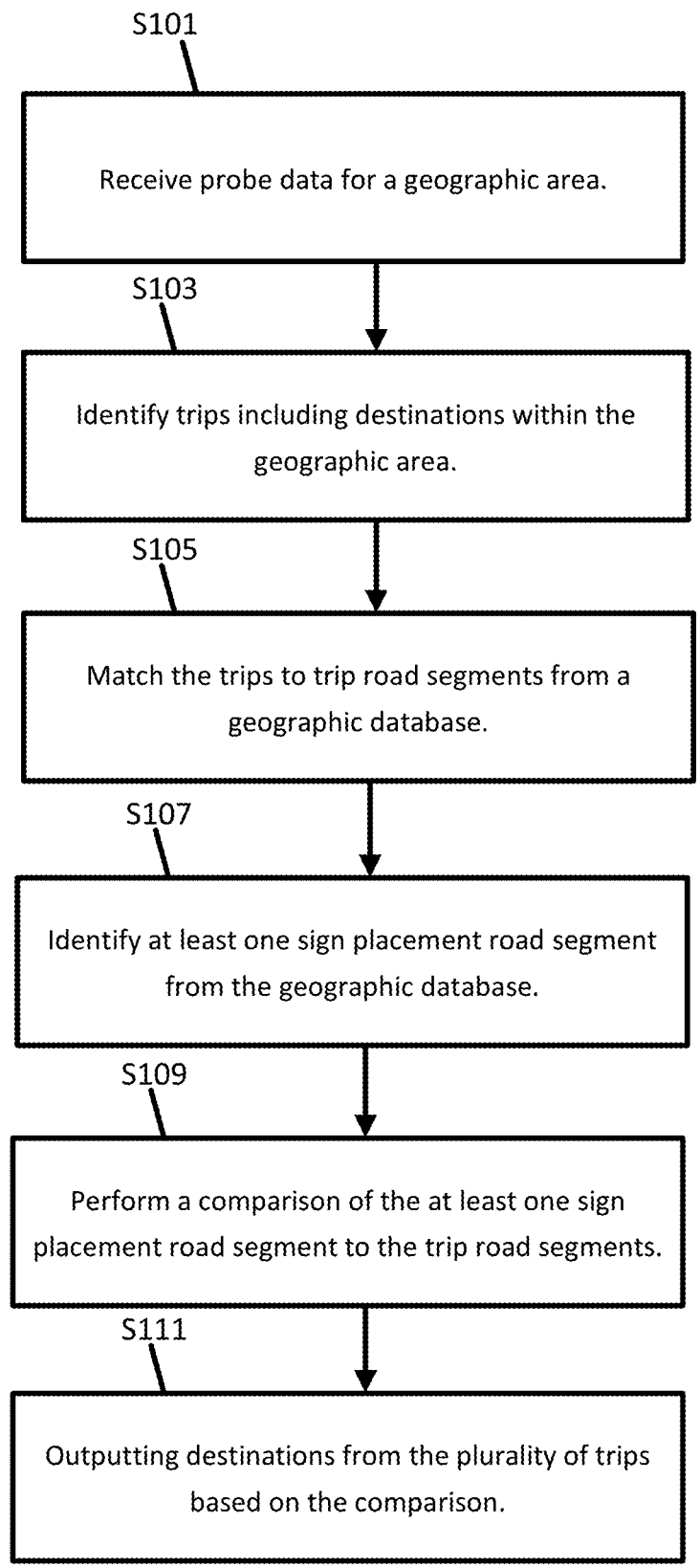
FIG. 10 illustrates an example flowchart for the operation of the server of FIG. 9.

FIG. 9 illustrates an example server 125, which may apply to the system of FIGS. 2A and/or 2B. The server 125 includes a processor 300, a communication interface 305, a memory 301, and a database 123. An input device (e.g., keyboard or personal computer 128) may be used to enter settings to the server 125. Example settings may include the model parameters for calculating the influence values. In addition, the input device may be used to manually enter trip data. Additional, different, or fewer components may be provided in the server 125. FIG. 10 illustrates an example flowchart for the operation of server 125. Additional, different, or fewer acts may be provided.

The geographic database 123 includes road segments, and at least one road segment associated with at least one road object attribute. The road object attribute may describe the potential sign placement locations and/or the selected sign placement locations. The memory 301 is configured to store received probe data and/or trips.

At act S101, the processor 300 or the communication interface 305 is configured to receive probe data for a geographic area, the probe data collected by one or more sensors. The communication interface 305 is a means for receiving probe data for a geographic area, the probe data collected by one or more sensors.

At act S103, the processor 300 identifies trips within the geographic area. The trips may be routes taken by one or more probes or mobile devices that ended at destinations in the geographic area, or were entirely contained with the geographic area. The processor 300 may include circuitry or a module or an application specific controller as a means for identifying a trips and/or destinations within the geographic area.

At act S105, the processor 300 is configured to perform map matching to match the trips to road segments in the geographic database 123. The road segments of the trips are referred to as trip road segments. In map matching, the processor 300 associates geographic coordinates (e.g., latitude, longitude) with the locations or position data from the probes to identify the nearest road segments. Map matching converts the set of probe data to a sequence of road segments making up the trip. The processor 300 may include circuitry or a module or an application specific controller as a means for map matching the trips to trip road segments from a geographic database.

At act S107, the processor 300 identifies at least one sign placement road segment from the geographic database. The sign placement road segment may be a road segment that has been designated as suitable for a sign. The sign placement road segment may be a particular roadway that is under investigation for signage. The sign placement road segment may be road segments having a particular functional classification. The sign placement road segment may be roads having a particular shape, speed limit, grade, or other attribute. The sign placement road segment may be selected based on user input. The sign placement road segment may be locations offered for lease or sale by a website. The sign placement road segment may be road segments along a particular road. The processor 300 may include circuitry or a module or an application specific controller as a means for identifying at least one sign placement road segment from the geographic database.

At act S109, the processor 300 performs a comparison of the at least one sign placement road segment to the trip road segments. The comparison determines when the sign placement road segment is included in the trip. The trip includes the sign placement road segment when the vehicle collecting the probe data for the trip traveled on all or part of the sign placement road segment when collecting the probe data. This is an indication that the vehicle passed the sign location. The processor 300 may include circuitry or a module or an application specific controller as a means for performing a comparison of the at least one sign placement road segment to the trip road segments.

At act S111, the processor 300 outputs destinations from the trips based on the comparison of the at least one sign placement road segment to the trip road segments. The destinations are locations included in the trip. The destinations may be associated with the content of a sign at the sign placement road segment. The destinations and placement road segments for multiple trips may be analyzed to determine the effectiveness of various sign placement locations, and alternatively, for the effectiveness of various sign placement locations for particular destinations or points of interest. The processor 300 may include circuitry or a module or an application specific controller as a means for outputting destinations from the trips based on the comparison of the at least one sign placement road segment to the trip road segments.

Figure 11:
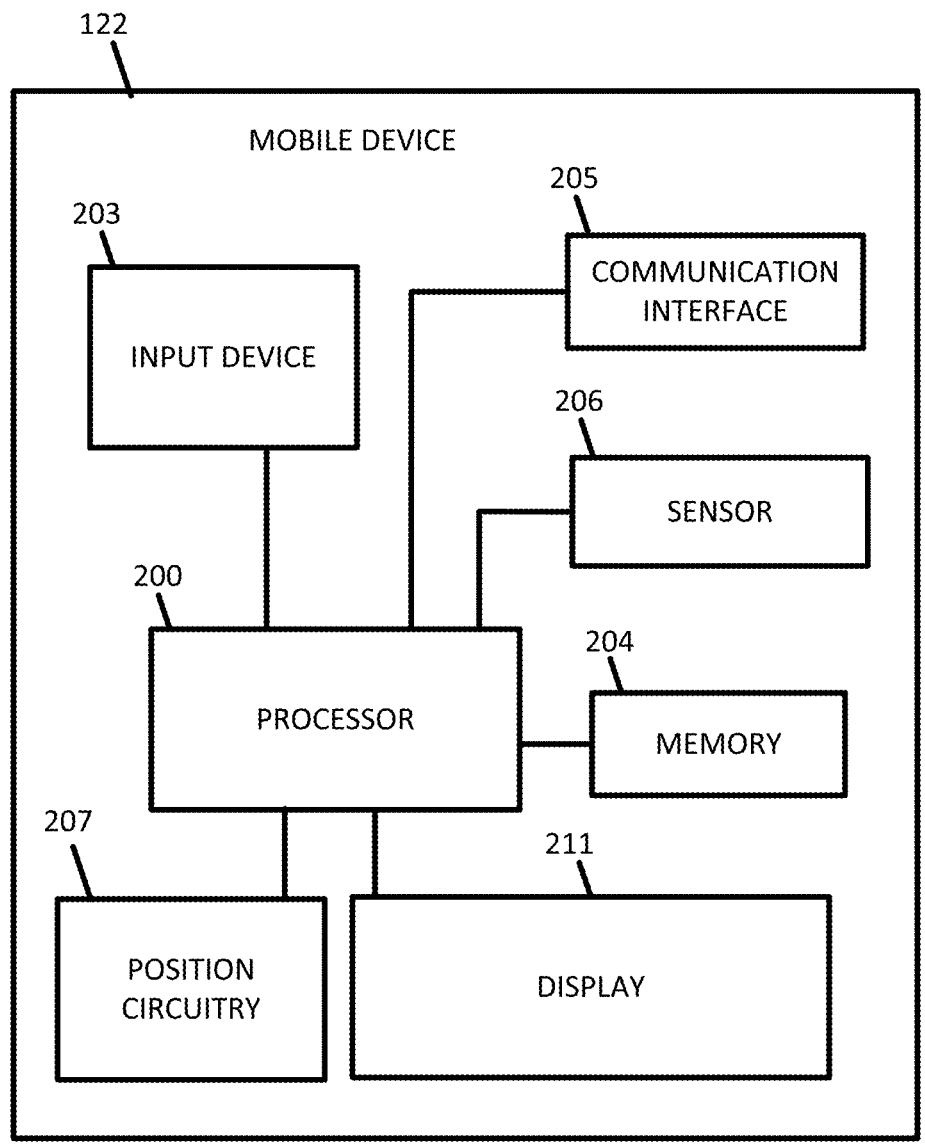
FIG. 11 illustrates an example mobile device.
Figure 12:
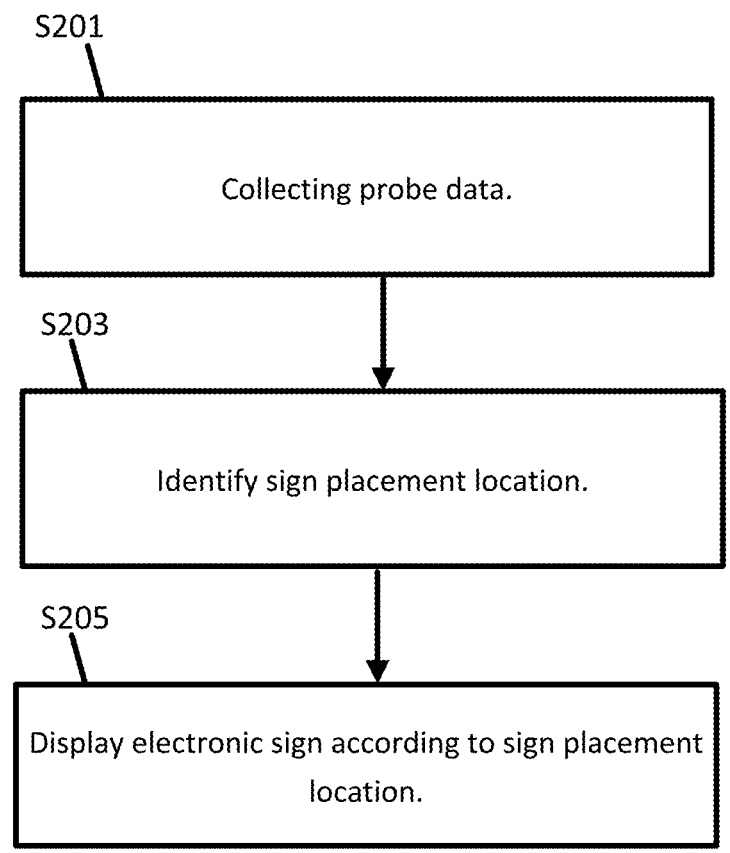
FIG. 12 illustrates an example flowchart for the operation of the mobile device of FIG. 11.

FIG. 11 illustrates an exemplary mobile device 122 of the system of FIGS. 2A and/or 2B. The mobile device 122 includes a processor 200, a memory 204, an input device 203, a communication interface 205, position circuitry 207, a display 211, and a sensor 206. The sensor 206 may include a camera, a LiDAR device, or another sensor described herein. Additional, different, or fewer components are possible for the mobile device 122. FIG. 12 illustrates an example flowchart for the operation of mobile device 122. Additional, different, or fewer acts may be provided.

At act S201, the position circuitry 207, or the processor 200 through the position circuitry 207, detects a position of a mobile device 122. The position detector or position circuitry 207 is configured to determine a geographic position associated with the roadway. The position circuitry 207 is means for determining the position of the mobile device 122. A succession of positions for the mobile device 122 define a trip. The trip may include an origin or beginning and a destination or ending.

At act S203, the processor 200 may identify a sign placement location from the geographic database 123. The geographic database 123 stores at least one sign placement location, and the at least one sign placement location may be calculated from a comparison of at least one sign placement road segment to a trip road segments a set of trips including the trip of the mobile device, according to other embodiments described herein. The processor 200 includes circuitry or a module or an application specific controller as a means for identifying a sign placement location from the geographic database 123.

At act S205, the display 211 or the processor 200 may display an electronic sign according to the sign placement location. The electronic sign is an image including at least one descriptor of a destination. The processor 200 may monitor positions detected by the position circuitry 207. When the mobile device 122 enters a particular area (e.g., a perimeter defined by geographic coordinates), the processor 200 accesses the electronic sign from memory 201 and sends the electronic sign to the display 211. In one alternative to a perimeter, the processor 200 may determine when the mobile device 122 passes, approaches, or comes within a predetermined distance to the sign placement location.

More specifically, the processor 200 may query the geographic database 123 according to the current location of the mobile device 122 and retrieve the destination descriptor when the mobile device 122 arrives at the sign placement location. The display 211 includes circuitry or a module or an application specific controller as a means for displaying an electronic sign according to the sign placement location.

In some examples, the user may select the destination from the electronic sign when the mobile device 122 passes the sign placement location. The processor 200 may generate a driving assistance message in response to the selection of the electronic sign. The driving assistance message may provide routing directions to the destination. The driving assistance message may be presented on display 211.

Alternatively, the processor 200 may generate the driving assistance message as a driving command for an autonomous driving system in response to the selection of the electronic sign. The driving command may adjust a trajectory or a speed of the vehicle. The driving command may instruct the vehicle to steer left, steer right, or slow down in completing a route to the destination from the electronic sign. The processor 200 includes circuitry or a module or an application specific controller as a means for generating the driving assistance message.

The mobile device 122 may generate a routing instruction based on the selection of the destination or the electronic sign. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on display 211 outlining the route, the types of maneuvers to be taken at various locations along the route, locations of certain types of features, and so on, any of which may include the lane line objects for lane marking or roadside objects.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

Figure 13:
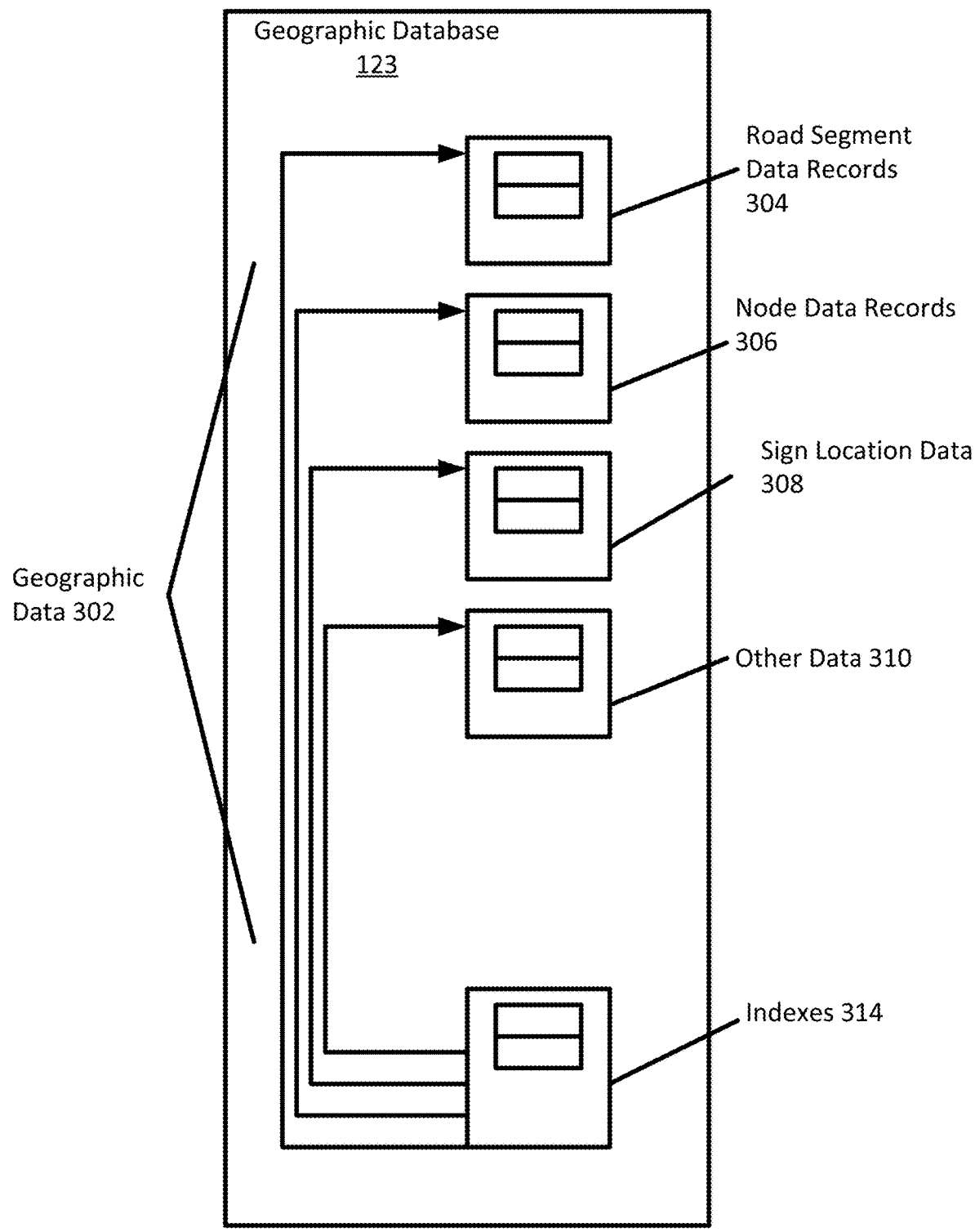
FIG. 13 illustrates an example geographic database.

In FIG. 13, the geographic database 123 may contain at least one road segment database record 304 (also referred to as "entity" or "entry") for each road segment in a particular geographic region. Any of the features of geographic database 123 may be applied to a local databases stored in memory 204 of the mobile device 122. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include other kinds of data 310. The other kinds of data 310 may represent other kinds of geographic features or anything else. The other kinds of data may include point of interest (POI) data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate sign placement data 308 with a road segment in the segment data records 304 or a geographic coordinate. An index 314 may, for example, store data relating to one or more locations for sign placement data 308. The locations in the sign placement data 308 may be possible sign placement locations that are compared using the techniques herein. The locations in the sign placement data 308 may be the selected sign placement locations selected for one or more specific destinations according to the techniques herein.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 relevant for this invention are: temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 14:
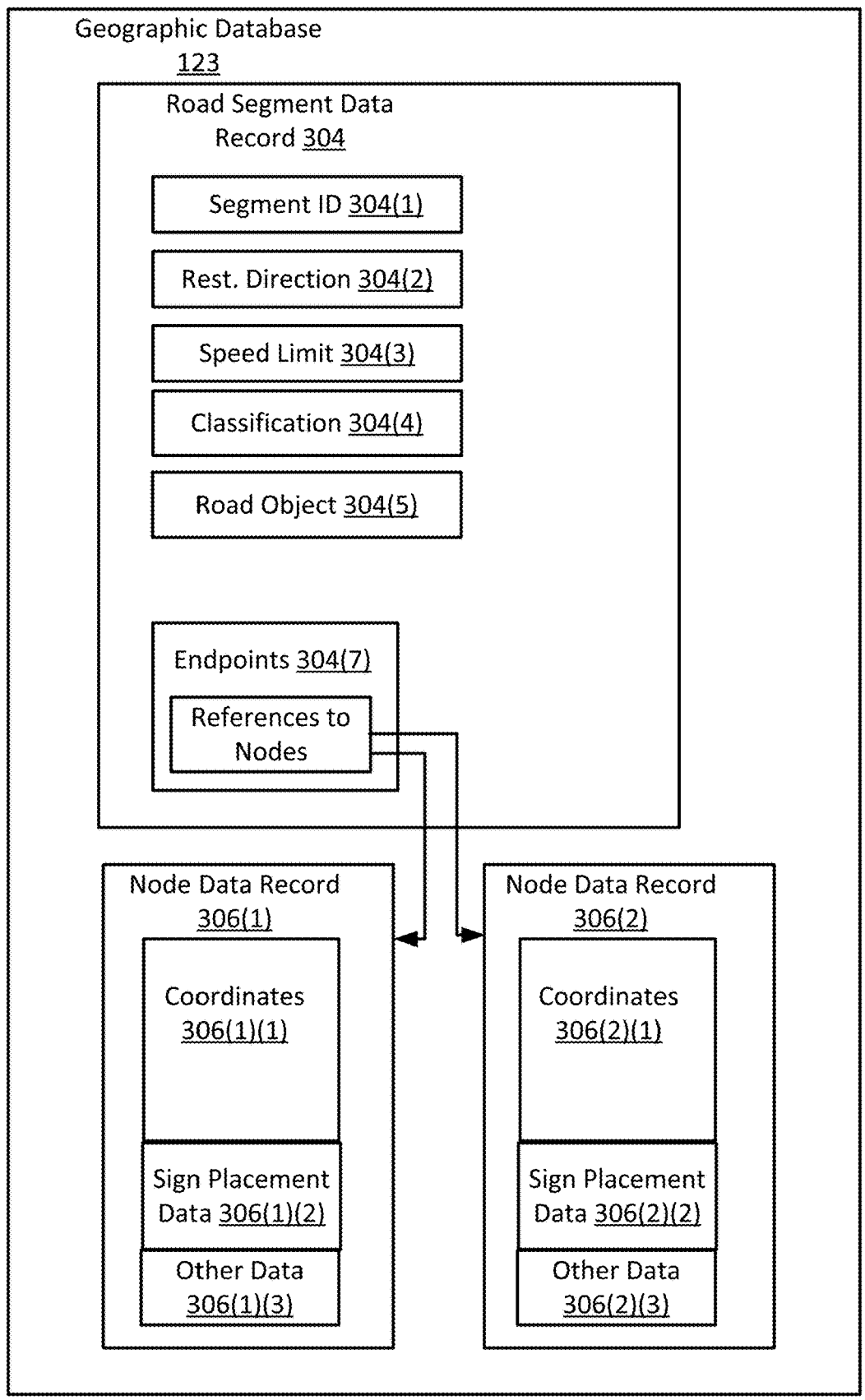
FIG. 14 illustrates an example geographic database.

FIG. 14 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 14 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and sign placement data 306 (1)(2) and 306(2)(2), which may include locations of potential sign placements or selected sign placement locations. The locations of sign placements may be stored as geographic coordinates. The locations of sign placements may be stored as an attribute to road segments. The road segment attribute may specify a relative location of the sign placement along the road segment. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The database 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. An output interface including audio capabilities, or speakers may be incorporated with the mobile device 122. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory.

Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment to streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method for calculating a geographic location for sign placement, the method comprising:
  receiving probe data for a geographic area, the probe data collected by one or more sensors;
  identifying, based on the received probe data, a plurality of trips within the geographic area, wherein the plurality of trips include destinations;
  map matching the plurality of trips to a plurality of trip road segments from a geographic database;
  identifying at least one sign placement road segment from the geographic database;
  performing, using a processor, a comparison of the at least one sign placement road segment to the plurality of trip road segments; and
  outputting one or more destinations from the plurality of trips based on the comparison of the at least one sign placement road segment to the plurality of trip road segments.

Embodiment 2

The method of embodiments 1, further comprising:
  generating a sign placement message in response to the outputted one or more destinations.

Embodiment 3

The method of any of embodiments 1 and 2, wherein the one or more destinations includes a plurality of destinations, and outputting the plurality of destinations from the plurality of trips comprises:
  generating an origin-destination matrix that matches the at least one sign placement road segment to the plurality of destinations.

Embodiment 4

The method of any of embodiments 1-3, wherein the origin-destination matrix includes a plurality of sign placement road segments including the at least one sign placement road segment.

Embodiment 5

The method of any of embodiments 1-4, further comprising:
  determining a fractional frequency for the plurality of trips based on the comparison of the at least one sign placement road segment to the plurality of trip road segments; and
  selecting the geographic location for sign placement based on the fractional frequency.

Embodiment 6

The method of any of embodiments 15, further comprising:
  calculating an influence value for the at least one sign placement road segment.

Embodiment 7

The method of any of embodiments 1-6, wherein the influence value depends on travel time, respective distances between the at least one sign placement road segment and the one or more destinations, and the fractional frequency.

Embodiment 8

The method of any of embodiments 1-7, wherein the at least one sign placement road segment comprises a plurality of sign placement road segments, the method further comprising:
  receiving an input indicative of a destination; and
  selecting a sign placement location for the destination based on the comparison of the plurality of sign placement road segment to the plurality of trip road segments.

Embodiment 9

The method of any of embodiments 1-8, further comprising:
  receiving an input indicative of a sign placement location; and
  selecting a destination based on the comparison of the plurality of sign placement road segment to the plurality of trip road segments.

Embodiment 10

An apparatus, configured to perform and/or control the method of any of embodiments 1-9 or comprising means for performing and/or controlling any of embodiments 1-9.

Embodiment 11

An apparatus, comprising at least one processor and at least one memory including computer program code for one or more programs, the at least one memory and the computer program code configured to, with the at least one processor, to perform and/or control the method of any of embodiments 1-9.

Embodiment 12

A computer program comprising instructions operable to cause a processor to perform and/or control the method of any of embodiments 1-9, when the computer program is executed on the processor.

We claim:
1. A method for sign placement, the method comprising:
receiving probe data collected by one or more sensors;
defining a bounding box for a predetermined geographic area having a set of destinations;
identifying, based on the received probe data, a plurality of trips that end within the bounding box for the predetermined geographic area at one or more of the set of destinations;
map matching the plurality of trips to a plurality of trip road segments from a geographic database;
identifying at least one sign placement road segment from the geographic database;
performing, using a processor, a comparison of the at least one sign placement road segment to the plurality of trip road segments;
calculating a fractional frequency for the plurality of trips based on the comparison of the at least one sign placement road segment to the plurality of trip road segments;
calculating an influence value for the at least one sign placement road segment, wherein the influence value depends on travel time, respective distances between the at least one sign placement road segment and destinations, and the fractional frequency;
selecting a geographic location for sign placement based on the influence value; and
sending a sign placement message including the selected geographic location for sign placement to an external device configured to present information associated with a destination from the set of destinations for the geographic location for sign placement,
wherein a sign is placed at the select geographic location in response to the sign placement message.
2. The method of claim 1, wherein outputting the plurality of destinations from the plurality of trips comprises:
generating an origin-destination matrix that matches the at least one sign placement road segment to the plurality of destinations.
3. The method of claim 2, wherein the origin-destination matrix includes a plurality of sign placement road segments including the at least one sign placement road segment.
4. The method of claim 1, wherein the influence value is provided by:

5. The method of claim 1, wherein the at least one sign placement road segment comprises a plurality of sign placement road segments, the method further comprising:
receiving an input indicative of a destination; and
selecting a sign placement location for the destination based on the comparison of the plurality of sign placement road segment to the plurality of trip road segments.
6. The method of claim 1, further comprising:
receiving an input indicative of a sign placement location; and
selecting a destination based on the comparison of the plurality of sign placement road segment to the plurality of trip road segments.
7. An apparatus for calculating a geographic location for sign placement, the apparatus comprising:
a communication interface configured to receive probe data collected by one or more sensors;
a geographic database including road segments for a geographic area; and
a controller configured to define a bounding box for a predetermined geographic area having a set of destinations, match at least one trip from a plurality of trips for destinations within the geographic area with at least one sign placement road segment from the geographic database and perform a comparison of the at least one sign placement road segment to the plurality of trips,
wherein the controller is configured to calculate a fractional frequency for the plurality of trips based on the comparison of the at least one sign placement road segment to the plurality of trips and calculate an influence value for the at least one sign placement road segment, wherein the influence value depends on travel time, respective distances between the at least one sign placement road segment and destinations, and the fractional frequency; and
an external device configured to instruct sign installation associated with a destination from the set of destinations for the at least one sign placement location.
8. The apparatus of claim 7, wherein the controller is configured to generate an origin-destination matrix that matches the at least one sign placement road segment to the destinations.
9. The apparatus of claim 7, wherein the origin-destination matrix includes a plurality of sign placement road segments including the at least one sign placement road segment.
10. The apparatus of claim 7, wherein the controller is configured to select the geographic location for sign placement based on the fractional frequency.
11. The apparatus of claim 7, wherein the influence value is provided by:

$$I_{kj} = \sum_{i=k}^{n} C_{ij}^{-\alpha} \cdot (1 + D_{k \to i})^{-\beta} \cdot f_{ij}^{-\gamma}$$

wherein:
k is a reference position,
$c_{ij}$ is travel time from position i to the destination j and α represents a first model parameter,
$D_{k \to i}$ is a distance from the reference position k to position i and β represents a second model parameter, and
$f_{ij}$ is the fractional frequency for trips to the destination j from position i and γ represents a third model parameter.

$$I_{kj} = \sum_{i=k}^{n} C_{ij}^{-\alpha} \cdot (1 + D_{k \to i})^{-\beta} \cdot f_{ij}^{-\gamma}$$

wherein:
k is a reference position,
$c_{ij}$ is travel time from position i to the destination j and α represents a first model parameter,
$D_{k \to i}$ is a distance from the reference position k to position i and β represents a second model parameter, and
$f_{ij}$ is the fractional frequency for trips to the destination j from position i and γ represents a third model parameter.

12. An apparatus comprising:
position circuitry configured to determine a trip including a plurality of geographic positions of a mobile device;
a geographic database configured to store at least one sign placement location, wherein the at least one sign placement location is calculated from a comparison of at least one sign placement road segment to a plurality of trip road segments from a plurality of trips including the trip of the mobile device;
a controller is configured to calculate a fractional frequency for the plurality of trips based on the comparison of the at least one sign placement road segment to the plurality of trips and calculate an influence value for the at least one sign placement road segment, wherein the influence value depends on travel time, respective distances between the at least one sign placement road segment and destinations, and the fractional frequency; and
a display that presents information for the installation of a sign at a destination from the set of destinations for the at least one sign placement location.

13. The apparatus of claim 12, wherein an origin-destination matrix matches the at least one sign placement road segment to destinations.

\* \* \* \* \*

UNITED STATES PATENT AND TRADEMARK OFFICE
CERTIFICATE OF CORRECTION

PATENT NO. : 11,170,138 B2
APPLICATION NO. : 15/840248
DATED : November 9, 2021
INVENTOR(S) : Stroila et al.

Page 1 of 1

It is certified that error appears in the above-identified patent and that said Letters Patent is hereby corrected as shown below:

In the Claims

Claim 4, Column 27, Line 61, "7" should be deleted before "is travel".

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*